UNITED STATES PATENT OFFICE 2,670,365

HYDROCARBON SYNTHESIS PROCESS

Rhea N. Watts and C F Gray, Baton Rouge, La., assignors to Standard Oil Development Company, a corporation of Delaware No Drawing. Application March 5, 1949, Serial No. 79,911

1 Claim. (Cl. 260—449.6)

This invention relates to the catalytic conversion of carbon oxides with hydrogen to form valuable synthesis products. More particularly, this invention is concerned with an improved method and catalyst permitting a high degree of flexibility in carrying out this synthesis using the fluid solids technique, at the same time retarding or preventing catalyst disintegration and obtaining exceptionally high yields of valuable liquid products.

The synthetic production of liquid hydrocarbons from gas mixtures containing various proportions of carbon monoxide and hydrogen is already well known, and numerous catalysts, usually containing an iron group metal, have been described which are specifically active in promoting the desired reactions at certain preferred operating conditions. Thus cobalt supported on kieselguhr is used when relatively low pressures of 15 to about 75 pounds and low temperatures of about 375°-425° F. are applied in the manufacture of a substantially saturated hydrocarbon product while at the higher temperatures (450°-750° F.) and higher pressures of 5-30 atmospheres and higher required for the production of unsaturated and branch chained products of high anti-knock value, iron type catalysts are more suitable.

In both cases the reaction is strongly exothermic and the utility of the catalyst declines steadily in the course of the reaction, briefly due to the deposition of non-volatile conversion products, such as carbon, paraffin wax, and the like on the catalyst.

The extremely exothermic character and high temperature sensitivity of the synthesis reactor and the relatively rapid catalyst deactivation has led, in recent years, to the application of the so-called fluid solids technique wherein the synthesis gas is contacted with a turbulent bed of finely divided catalyst fluidized by the gaseous reactants and products. This technique permits continuous catalyst replacement and greatly improved heat dissipation and temperature control.

However, the adaptation of the hydrocarbon synthesis process to the fluid solids technique has encountered serious difficulties particularly with respect to catalyst deposits and their detrimental effects on the fluidization characteristics and mechanical strength of the catalyst.

As stated above, one of the most important modifications of the hydrocarbon synthesis reaction requires the use of iron type catalysts. These catalysts combine a high synthesizing activity and selectivity to normally liquid products with a strong tendency to carbonize during the synthesis reaction, that is, to form fixed carbon or coke-like catalyst deposits, probably as a result of the reaction $2CO \rightleftharpoons C + CO_2$. These deposits cannot be readily removed by conventional methods of synthesis catalyst regeneration, such as solvent extraction, reduction, steam treating, or the like.

These carbon deposits weaken the structure of the iron catalyst crystal, probably due to carbide formation, and lead to rapid catalyst disintegration, particularly in fluid solids operation, by shattering the crystal structure. The reduction of the true density of the catalyst resulting from its high content of low density carbon, coupled with the rapid disintegration of the catalyst particles, causes the fluidized catalyst bed to expand, thereby reducing its catalyst concentration and ultimately resulting in the loss of the catalyst bed because it becomes impossible to hold the catalyst in a dense phase at otherwise similar fluidization conditions. With these changes in fluid bed characteristics the heat transfer from and throughout the bed decreases markedly, favoring further carbonization and accelerating the deterioration of the fluidity characteristics of the bed.

Prior to the present invention it has been found that this disintegration of the catalyst bed due to carbon formation may be substantially reduced by supporting the iron catalyst in an inert carrier. Thus it has been suggested to use silica gel, kieselguhr, pumice, carbon and the like. The advantage of using a carrier support is that carbon formation only attacks the surface of the supported catalyst, but will not penetrate the inert interior or core, thus substantially reducing the quantity of non-fluidizable material.

In spite of the increased resistance to disintegration due to carbon formation, the use of catalyst supported on carriers has been accompanied by certain disadvantages. Thus the mechanical strength of some carriers such as kieselguhr, while adequate for a fixed bed process, is insufficient to withstand the attrition effects accompanying the fluid solids process, and the catalyst support disintegrates. Furthermore, due to the dilution effect of the inert material, catalyst supported on carriers have not always shown the same selectivity and conversion as the unsupported material. Furthermore, certain catalyst carrier materials have undesirable effects upon the synthesis products.

The present invention overcomes these difficulties and affords various additional advantages as will be apparent from the description to follow.

It is, therefore, the principal object of the invention to provide an improved process for the catalytic synthesis of hydrocarbons from CO and $H_2$.

Another object of the invention is to provide an improved iron synthesis catalyst supported on a carrier and improved means for preparing the same.

Still another object of the invention is to increase the flexibility and adaptability of the iron type fluid hydrocarbon synthesis process. Other objects and advantages will appear hereinafter.

It has now been found that an excellent disintegration resistant catalyst can be prepared by impregnating Alundum with an iron salt, such as ferric nitrate, and with a suitable alkali metal salt promoter. Not only has the catalyst thus formed considerable mechanical strength but also it has been found to give exceptionally high yields of valuable liquid hydrocarbon synthesis products, and also is found to be exceptionally active in terms of synthesis gas converted.

The use of Alundum as a carrier for an iron synthesis catalyst has the further advantage of having a comparatively low bulk density. The lower bulk density of an Alundum supported iron synthesis catalyst increases substantially the ease of fluidization, decreasing the pressure in the feed gases needed to keep the mass fluidized. Thus Alundum based iron synthesis catalyst has a Le Chatelier density of about 3.95 gms./cc. as compared with a typical iron base catalyst of 4.95. For comparison, silica-magnesia cracking catalyst has a Le Chatelier density of 2.4 and is known to be considerably more readily fluidizable than the more massive unsupported iron synthesis catalyst. Alundum base synthesis catalyst, therefore, approaches cracking catalyst in its adaptability to fluidization. However, while cracking catalyst has a high attrition value, as indicated by the fact that a Roller attrition of a silica-alumina catalyst shows an increase of 3% to 4% in 0–10 micron fractions per hour after the first hour, Alundum base iron synthesis catalyst shows only a 1.23% increase indicating its high mechanical strength. This is close to the value for an unsupported iron catalyst, such as ammonia synthesis catalyst.

To illustrate this desirable property, in the table below is given a typical Roller analysis of an Alundum impregnated iron type hydrocarbon synthesis catalyst.

| Particle Diameter | Weight Percent | Time Rate |
| --- | --- | --- |
| 0–10 | 10 | 1.23%. |
| 10–20 | 1 | |
| 20–40 | 1 | (=Percent 0–10 micron material formed per hour after first hour of Roller attrition). |
| 40–80 | 2 | |
| 80+ | 86 | |

In accordance with the present invention, supported iron type synthesis catalysts of great mechanical strength and highest activity and liquid product selectivity are prepared by impregnating Alundum, which is a product containing from about 75–95% $Al_2O_3$ and 2–20% silica, with varying minor amounts of oxides of magnesium, calcium, titanium, and iron, and which has been prepared by fusing bauxite or other aluminum oxide ore at a temperature over 2000° F. with silica and with minor quantities of clay and felspar, and impregnating with an iron salt and a catalyst promoter. Because of the high temperature treatment to which the mixture has been exposed, the surface area is low, and hence the activity of the alumina is destroyed and its deleterious effect upon the synthesis products is prevented.

In a specific example Alundum base synthesis catalyst was prepared as follows:

A sample of Alundum was prepared by fusing pure (99.58%) alumina with silica to give a product analyzing as follows:

| | Per cent |
| --- | --- |
| $Al_2O_3$ | 85.5 |
| $SiO_2$ | 12.1 |
| $Fe_2O_3$ | 0.5 |
| $MgO$ | 0.2 |
| $CaO$ | 0.2 |
| $Na_2O$ | 0.4 |
| $K_2O$ | 0.3 |
| $TiO_2$ | 0.8 |

150 grams of the above material was impregnated with 191 grams of $Fe(NO_3)_3$; $9H_2O$ in 50 cc. $H_2O$. The mass was dried in a Freas oven. Thereupon the mass was heated in a muffle furnace for 2 hours at 800° F. to decompose the nitrates. Thereupon the product was impregnated with 3.85 grams of $K_2CO_3$ dissolved in 50 cc. water and again dired in a Freas oven. The resulting catalyst material was analyzed and found to contain 11.9% iron and 1.6% potassium promoter as $K_2O$.

Catalysts of different origin and composition, both supported and unsupported were tested in fixed bed operation at the conditions and with the results tabulated in the example below.

*Example*

[All runs carried out at 250 p. s. i. g. and 600° F. except*.]

| Catalyst Composition | Run, Hrs. | Feed Gas Ratio, $H_2/CO$ | CO Conversion Output | cc. $C_4+/$ m.³ $H_2+$ CO Consumed |
| --- | --- | --- | --- | --- |
| | | | Percent | |
| 1. Alundum base | 14–85 | 1.1/1 | 97 | 228 |
| | 86–109 | 1.1/1 | 97 | 235 |
| | 134–157 | 2/1 | 97 | 219 |
| | 158–181 | 2/1 | 97 | 218 |
| | 182–253 | 2/1 | 97 | 207 |
| 2. Ammonia Synthesis Catalyst, Unsupported *(650° F.). | 15–86 | 2/1 | 97 | 156 |
| | 135–153 | 2/1 | 97 | 160 |
| | 519–590 | 2/1 | 96 | 153 |
| 3. Ammonia Synthesis Catalyst Supported on Active alumina. | 53–100 | 2.1/1 | 84 | 160 |
| | 221–268 | 2.1/1 | 78 | 130 |
| | 389–436 | 2.1/1 | 86 | 138 |

The standard ammonia synthesis catalyst in the above example was a reduced fused magnetite containing about 1.2% $K_2O$ and about 2.5% alumina.

The supported ammonia synthesis catalyst was prepared by precipitating $Al(OH)_3$ from an aqueous solution of $Al(NO_3)_3$ with ammonia, washing, and mulling the wet filter cake with ammonia synthesis catalyst and drying.

In the above example, the superiority of the Alundum based catalyst over the standard ammonia synthesis catalyst is readily apparent. In hydrocarbon synthesis practice, yields over 180 cc. of liquid product ($C_4+$) per cubic meter of $CO+H_2$ consumed are considered very good, and yields of 200 cc. excellent. The exceptionally high yields obtained by the Alundum based catalyst, and its versatility in giving high yields both with 2/1 and 1/1 gas make it an outstanding catalyst.

The ammonia synthesis catalyst supported on alumina, however, gave considerably poorer results. This may be due in part to the activation of alumina which occurs under the conditions of synthesis temperature and pressure. With increased surface area of the alumina carrier, the cracking tendencies of the latter are enhanced, resulting in higher quantities of gases and lower yields of desired liquid product.

The catalyst of the present invention affords the greatest advantages, because of its attrition resistance as well as its resistance to carbon disintegration, in connection with the dense phase fluid type operation. Therefore, the preferred catalyst of the invention essentially consists of particles of fluidizable size of suitably promoted iron catalyst supported on an Alundum carrier, the support preferably carrying about 3% to 35% synthesis catalyst as iron. Particle sizes within the range of 20–200 microns, preferably 50–180 microns are suitable for this purpose.

The invention admits of numerous modifications apparent to those skilled in the art. Thus it may be desirable to use other means than impregnation to put the catalyst in the carrier. Other iron salts that may be used are, for example, $Fe_2(C_2O_4)_3$ and $Fe(CHO_2)_3$. The preferred amount of iron in the carrier is about 5.0 to 15.0%, though higher amounts may be used. The $K_2CO_3$ promoter content is preferably 0.2 to 2.0% calculated as $K_2O$, but other alkali metal salt promoters, such as $Na_2CO_3$, KF, KOH, etc. may be employed.

While the foregoing description and exemplary operations have served to illustrate specific embodiments of the invention, they are not intended to limit its scope. Other modifications may appear to those skilled in the art without departing from the spirit of the invention.

What is claimed is:

In the catalytic synthesis of normally liquid hydrocarbons from CO and $H_2$ in the presence of an iron-type catalyst, the improvement which comprises contacting said CO and $H_2$ at synthesis conditions with a catalyst prepared by impregnating an Alundum carrier consisting of about 85% $Al_2O_3$ and 12% $SiO_2$ with an iron salt to give a product containing about 5 to 15% iron and incorporating into the product a minor proportion of an alkali metal compound promoter.

RHEA N. WATTS.
C F GRAY.

References Cited in the file of this patent
UNITED STATES PATENTS

| Number | Name | Date |
|---|---|---|
| 1,122,811 | Snelling | Dec. 29, 1914 |
| 2,209,908 | Weiss | July 30, 1940 |
| 2,257,457 | Fischer et al. | Sept. 30, 1941 |
| 2,460,508 | Johnson | Feb. 1, 1949 |
| 2,463,228 | West et al. | Mar. 1, 1949 |
| 2,474,440 | Smith et al. | June 28, 1949 |
| 2,517,036 | Sensel et al. | Aug. 1, 1950 |
| 2,533,071 | Vesterdal et al. | Dec. 5, 1950 |